United States Patent
Fürst et al.

(10) Patent No.: US 9,965,546 B2
(45) Date of Patent: May 8, 2018

(54) FAST SUBSTRING FULLTEXT SEARCH

(71) Applicants: Karl Fürst, Wiesloch (DE); Juri Wichanow, Ludwigsburg (DE); Christoph Markowski, Ludwigsburg (DE)

(72) Inventors: Karl Fürst, Wiesloch (DE); Juri Wichanow, Ludwigsburg (DE); Christoph Markowski, Ludwigsburg (DE)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 14/666,763

(22) Filed: Mar. 24, 2015

(65) Prior Publication Data

US 2016/0283597 A1    Sep. 29, 2016

(51) Int. Cl.
   *G06F 17/30*    (2006.01)
(52) U.S. Cl.
   CPC .. *G06F 17/30616* (2013.01); *G06F 17/30622* (2013.01)
(58) Field of Classification Search
   USPC .................................................. 707/706, 710
   See application file for complete search history.

(56) References Cited

U.S. PATENT DOCUMENTS

| | | | |
|---|---|---|---|
| 8,788,260 B2* | 7/2014 | Nygaard | G06F 17/30719 375/240.25 |
| 2016/0171108 A1* | 6/2016 | Chen | H04L 67/32 707/767 |
| 2017/0168711 A1* | 6/2017 | Temple | G06F 3/0233 |
| 2017/0220552 A1* | 8/2017 | Medlock | G06F 17/276 |
| 2017/0235842 A1* | 8/2017 | Hegerty | G06F 17/30867 707/728 |
| 2017/0262633 A1* | 9/2017 | Miserendino | G06F 21/566 |
| 2017/0269708 A1* | 9/2017 | Ouyang | G06F 3/0237 |
| 2017/0277889 A1* | 9/2017 | Stolfo | G06F 21/56 |
| 2017/0300510 A1* | 10/2017 | Patthak | G06F 17/30153 |

* cited by examiner

*Primary Examiner* — Kim Nguyen
(74) *Attorney, Agent, or Firm* — Buckley, Maschoff & Talwalkar LLC

(57) ABSTRACT

A system includes receiving a substring to be searched and determining one or more N-grams associated with the received substring. A lookup of each of the one or more N-grams is performed using an N-gram index. A set of tokens associated with each of the one or more N-grams is calculated and a determination is made if the substring exits in the calculated set of tokens. The results of the determination if the substring exits in the set of tokens are outputted.

18 Claims, 6 Drawing Sheets

S0 = "lipopoly saccharide"
S1 = "neopolyol ester"
S2 = "cyclopolyenyl metal complex"
S3 = "lyposol metal ag"

T1 = "ag":           [S3]
T2 = "complex":      [S2]
T3 = "cyclopolyenyl": [S2]
T4 = "ester":        [S1]
T5 = "lipopoly":     [S0]
T6 = "lyposol":      [S3]
T7 = "metal":        [S2, S3]
T8 = "neopolyol":    [S1]
T9 = "saccharide":   [S0]

| | | | |
|---|---|---|---|
| "ac": | [T9] | "ly": | [T3, T5, T6, T8] |
| "ag": | [T1] | "me": | [T7] |
| "al": | [T7] | "mp": | [T2] |
| "ar": | [T9] | "ne": | [T8] |
| "cc": | [T9] | "ny": | [T3] |
| "ch": | [T9] | "ol": | [T3, T5, T6, T8] |
| "cl": | [T3] | "om": | [T2] |
| "co": | [T2] | "op": | [T3, T5, T8] |
| "cy": | [T3] | "os": | [T6] |
| "de": | [T9] | "pl": | [T2] |
| "en": | [T3] | "po": | [T3, T5, T6, T8] |
| "eo": | [T8] | "ri": | [T9] |
| "er": | [T4] | "sa": | [T9] |
| "es": | [T4] | "so": | [T6] |
| "et": | [T7] | "st": | [T4] |
| "ex": | [T2] | "ta": | [T7] |
| "ha": | [T9] | "te": | [T4] |
| "id": | [T9] | "yc": | [T3] |
| "ip": | [T5] | "ye": | [T3] |
| "le": | [T2] | "yl": | [T3] |
| "li": | [T5] | "yo": | [T8] |
| "lo": | [T3] | "yp": | [T6] |

FAST SUBSTRING FULLTEXT SEARCH

BACKGROUND

A full-text search comprises a technique for searching one or more computer-stored documents or a collection of documents that are stored in a database. A full-text search may differ from searches based on metadata or searches based solely on parts of the texts (e.g., titles, abstracts, selected sections, or bibliographical references).

In a conventional full-text search, a search engine may examine each word in every stored document as the full-text search attempts to match search criteria such as a specific term or a phrase that is specified by a user (e.g., a text string). Full-text search applications may have to handle large sets of data. For example, there may be millions of documents that need to be searched for a single text string.

When using a conventional full-text search to search for a term or phrase by scanning each document for the term or phrase, a search runtime, and corresponding CPU consumption, may be extremely high. Therefore, a full-text search that can reduce a search runtime and CPU consumption is desirable.

BRIEF DESCRIPTION OF THE DRAWINGS

FIG. 4 illustrates data strings according to some embodiments.

FIG. 5 illustrates a token index according to some embodiments.

FIG. 6 illustrates an N-gram index according to some embodiments.

DETAILED DESCRIPTION

The following description is provided to enable any person in the art to make and use the described embodiments. Various modifications, however, will remain readily apparent to those in the art.

The following embodiments relate to a novel full-text search associated with data strings of text, or other data, that, instead of scanning all data strings for the search term. Furthermore, the following embodiments implement a full-text search by tokenizing or segmenting the data to be searched, creating a token index (e.g., an inverted token index) and accessing the token index while searching for a particular term or phrase to achieve faster response times. The present embodiments may reduce CPU consumption during full-text searches.

Figure 1:
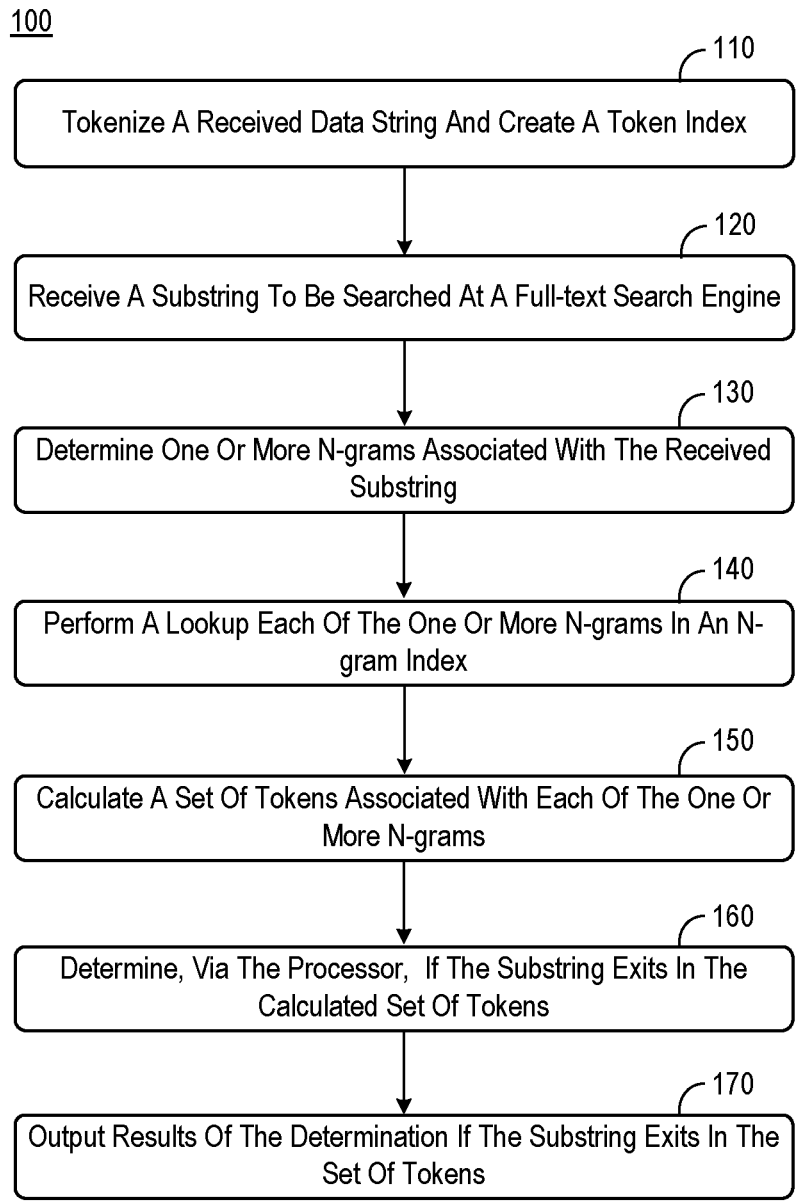
FIG. 1 is a method according to some embodiments.
Figure 2:
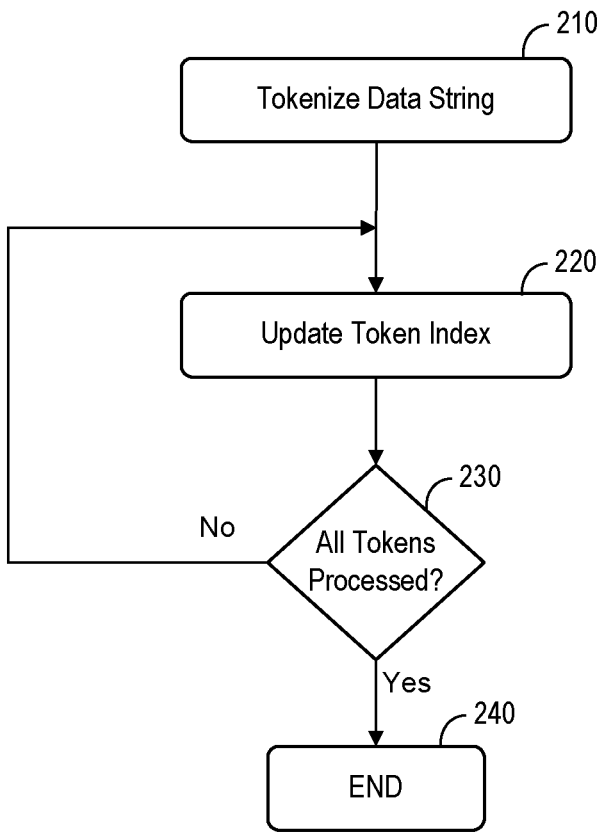
FIG. 2 illustrates a flow diagram according to some embodiments.

Now referring to FIG. 1, a method 100 is illustrated according to some embodiments. At 110, a received data string is tokenized and a token index is created. Referring now to FIG. 2, an embodiment of a process 200 that relates to tokenizing a data string and creating a token index associated with the data string is illustrated. At 210, a received data string is tokenized. Tokenizing may comprise splitting up the data string into individual portions (i.e., tokens). For example, some approaches to tokenizing a data string may comprise splitting the data at a pre-defined set of characters such as, but not limited to, spaces, tabs, commas or dashes.

For illustrative purposes, and to aid in understanding features of the specification, an example will now be introduced. This example is not intended to limit the scope of the claims. For example, and now referring to FIG. 4, the following set of four data strings may be tokenized. Data string zero ("S0") comprises "lipopoly saccharide", data string one ("S1") comprises "neopolyol ester", data string two ("S2") comprises "cyclopolyenyl metal complex" and data string three ("S3") comprises "lyposol metal ag".

Tokenizing S0, based on spaces, may produce two tokens: "lipopoly" and "saccharide". Tokenizing S1, based on spaces, may produce two tokens: "neopolyol" and "ester". Tokenizing S2, based on spaces, may produce three tokens: "cyclopolyenyl", "metal" and "complex". Tokenizing S3, based on spaces, may produce three tokens: "lyposol", "metal" and "ag". In the present example, both S2 and S3 produced a same token of "metal".

Each token may be added to a token index such as the token index 500 of FIG. Continuing with the above example, and as illustrated in FIG. 5, as a result of tokenizing S0 is broken down into two tokens, T5 and T9; S1 is broken down into two tokens, T4 and T8; S2 is broken down into three tokens, T2, T3 and T7; and S3 is broken down into three tokens, T1, T6 and T7. As can be seen from FIG. 5, the token T7, metal, is found in both S2 and S3.

In some embodiments, the token index may comprise an inverted token index that stores (i) a token identifier and (ii) an identifier of the data string that the token was derived from. An inverted index may comprise an index data structure that stores a mapping from content, such as words or numbers, to its locations in a database file, or in a document or a set of documents.

Referring back to FIG. 2, at 220 the token index may be updated (e.g., populated) with token information. Next, at 230, a determination is made if all tokens for a particular string have been processed. If all tokens have been processed, the process of tokenizing and indexing a particular data string ends at 240 else the process loops to continue updating the token index.

Referring back to FIG. 1, at 120 a substring to be searched is received at a full-text search engine. The substring may comprise a plurality of ASCII characters or symbols. Continuing with the above example, a first substring of "poly" may be received at a full-text search engine. In a second example, a second substring of "metal" may be received at the full-text search engine. Both "poly" and "metal" may comprise substrings to be searched. Each substring may first be tokenized. Tokenizing the substring may be accomplished in exactly the same way as in the data string was tokenized as described above. Each search token can be processed separately. In the present example, each search string comprises a single token. However, a search string may comprise multiple tokens.

Next, at 130, one or more N-grams associated with the received substring are determined. An N-gram may comprise a sequence of N adjacent elements in a string such as letters, numbers or symbols where N is an integer. For example, when N=2, a 2-gram is referred to as a bigram and when N=3, a 3-gram may be referred to as a trigram. In the present examples, and based on using bigrams, "poly" may be broken up using bigrams such as "po", "ol" and "ly" and "metal" may be broken up using bigrams such as "me", "et", "ta", and "al".

A lookup (e.g., a database query) may be performed against an N-gram index for each of the one or more N-grams at 140. An N-gram index may comprise an index of each of the tokens that were broken down into N-grams along with an indication of which token or tokens each N-gram is associated with. In some embodiments, the N-gram index may comprise an inverted index. For example, and referring to FIG. 6, an embodiment of an N-gram index 600 is illustrated. N-gram index 600 may illustrate a bigram index that indicates a plurality of bigrams 610 and their associated tokens 620. Continuing with the above examples, bigrams "po", "ol" and "ly" may be looked up in the N-gram index (which in this example is a bigram inverted index). Likewise, "me", "et", "ta", and "al" may also be looked up in the N-gram index.

Next, at 150, a set of tokens associated with each of the one or more N-grams may be calculated. The calculation may comprise looking up (e.g., querying) each N-gram in the N-gram index and determining which token(s) are associated with each N-gram. Continuing with the above examples, bigrams "po", "ol" and "ly" may be looked up in N-gram index 600 and may yield a result of a set of token candidates. In this example, the set of token candidates comprises tokens [T3, T5, T6, T8]. Similarly, "me", "et", "ta", and "al" may be looked up in the N-gram index 600 and may yield a result of a set of token candidates comprising [T7].

At 160 it is determined if the substring to be searched exits in the calculated set of tokens. Since the set of token candidates may contain false positives due to the N-gram index not containing information about an order of the N-grams in the token string, each token candidate (e.g., T3, T5, T6, T8) may be examined to determine if the token candidate actually contains the substring to be searched (e.g., poly). In the present example, Token T6, lyposol, contains all three bigrams "po", "ol", and "ly" but the bigrams are not in a correct order (i.e., the bigrams are in an order of "ly", "po", and "ol" and the bigrams are not in an order of "po", "ol", and "ly"). Hence, T6 is removed from the resulting token list [T3, T5, T8]. In the second example, since the bigrams "me", "et", "ta", and "al" are only found in a single token, T7, this step would result in a positive determination that the tokens are in a correct order. The correct order may be based on a type of language being searched. For example, the English language is read from left to right while the Hebrew language is read from right to left.

At 170, results of the determination if the substring exits in the calculated set of tokens are outputted. Outputting the results may comprise looking up the data strings that are associated with the tokens comprising the searched substring. This lookup may be performed against the token index 500. In the present example, token T3 is associated with S2, token T5 is associated with S0 and token T8 is associated with S1. Therefore, the output may comprise a set of data strings comprising [S0, S1, S2]. Similarly for "me", "et", "ta", and "al", token T7 is associated with S2 and S3 so the results would be a set of data strings comprising [S2, S3].

Figure 3:
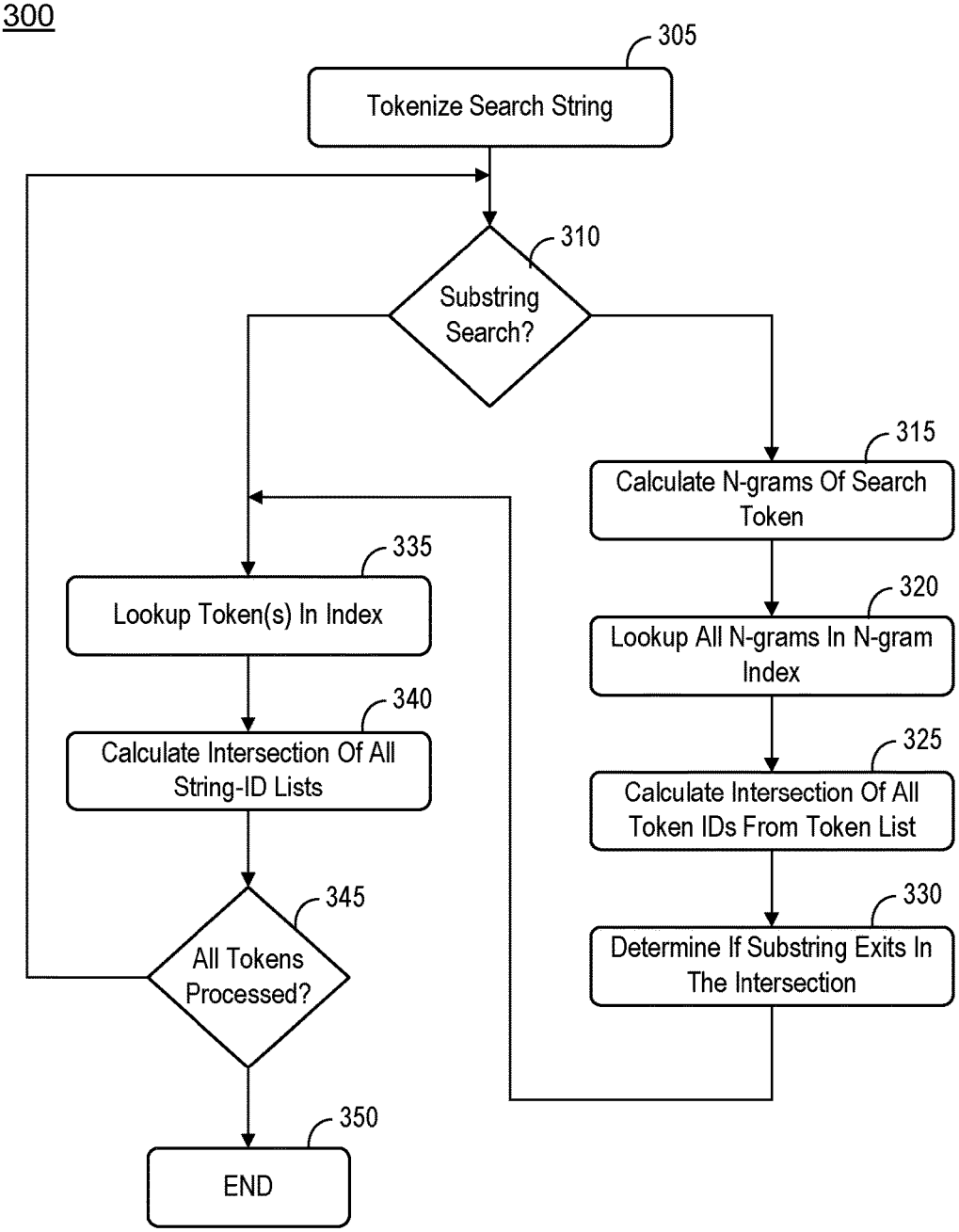
FIG. 3 is a flow diagram according to some embodiments.

Now referring to FIG. 3, a flow diagram of a process 300 is illustrated according to some embodiments. At 305, a search string is tokenized. The search string may be tokenized using a same tokenization algorithm as was used during the population of a token index associated with one or more data strings. For example, if a data string was tokenized (e.g., split into portions) based on spaces, then a string to be searched may also be tokenized based on spaces. In some embodiments, a sophisticated token separation algorithm may be utilized. For example, token separators or more advanced token separation algorithms like a dictionary lookup and out of vocabulary ("OOV") word identification may be used (e.g. for Asian languages) in lieu of spaces, commas, etc.

At 310, a determination is made if a search to be performed is (i) a substring search such as described with respect to FIG. 1 or (ii) a similar search which will be described below. The determination may be based on an input by a user.

If a substring search is selected, one or more N-grams associated with the tokenized substring are determined at 315. As described in the above examples, if a search string of "poly" is input and bigrams are implemented, then "poly" may be broken up using bigrams such as "po", "ol" and "ly".

Next, at 320, all N-grams are looked up in an N-gram index. Continuing with the above example, each of the bigrams "po", "ol" and "ly" may be looked up in a N-gram index (e.g., a bigram index for this example) such as the N-gram index illustrated in FIG. 6. The results of looking up the N-grams in the N-gram index may be stored in a token list. For example, in the case of looking up "po", "ol" and "ly", and as illustrated in FIG. 6, "po" may be found in tokens [T3, T5, T6, T8], "ol" may be found in tokens [T3, T5, T6, T8] and "ly" may be found in tokens [T3, T5, T6, T8]. Therefore, the token list comprises the following three sets of token identifications ("IDs"):
1. [T3, T5, T6, T8]
2. [T3, T5, T6, T8]
3. [T3, T5, T6, T8]

Next, at 325, an intersection of all token IDs from the token list is created. In the present example, intersecting the three sets of token IDs in the token list provides [T3, T5, T6, T8]∩[T3, T5, T6, T8]∩[T3,T5, T6, T8] which yields a result of [T3, T5, T6, T8]. In some embodiments, instead of using an intersection operation, a union of the elements may also be performed. In the present example, a union of the elements would produce a same result.

At 330, a determination is made if the search substring exists in the intersection of the token list. The intersection may contain false positives because the N-gram index of FIG. 6 does not contain information about an order of the bigrams in the data string so the token candidates from the intersection results [T3, T5, T6, T8] are to be examined individually to determine if they actually contain the substring poly.

Continuing with the above example, token T3, cyclopolyenyl, contains the string poly. Token T5, lipoply, contains the string poly. Token T8, neopolyol, contains the string poly. However, token T6, lyposol, contain all three bigrams "po", "ol", and "ly" but they are not in the correct order. As illustrated in FIG. 5, the order of the bigrams is "ly", "po" and then "ol". Therefore, T6 is removed from the token list which yields a result of [T3, T5, T8].

At 335, the resulting tokens are looked up in the token index to determine a particular string(s) that each token is associated with. For example, T3=S2, T5=S0, T5=S1. Then, at 340, an intersection of all string IDs are determined to produce a result set. For example, the final search result may comprise the union of the three strings based on the inverted token index: [S2]∪[S0]∪[S1]=[S0, S1, S2]. At 345 a determination is made if all tokens have been processed and if so, the process ends at 350.

Referring back to 310, if the determination is to use a similar search (e.g., not use a substring search), then the process 300 advances to 335 and a token is looked up in the token index. Each search token may be looked up in the token index to determine a list of string identifiers for each respective token. A similar search may comprise a fuzzier search since it does not determine if a substring exits in an intersection or union of token IDs. For the similar search, the intersection of all string identifiers may be calculated to get the full result list.

This similar search may be useful if a slight difference between the search string and the indexed token exists. This may comprise the case if the data quality is not perfect or the user entered a search word with a typo like "conplex" instead of "complex".

The results of the similar search may be scored based on a ratio of the concordant N-grams to a total number of N-grams of a token that are calculated. If this ratio is above a selected threshold then a resulting token or tokens may be considered a match. For example, if a number of concordant bigrams is used as a measure for similarity, the bigrams for "complex" are ["co", "om", "mp", "pl", "le", "ex"], and ["co", "on", "np", "pl", "le", "ex"] for "conplex". In this example 4 out of 6 bigrams match. If a ratio of 4/6 is considered to be similar then the tokens associated with the results may be considered a match. The ratio to determine if tokens are similar may be a user or system determined variable. Based on the above-example, a token T2 may be considered a match and token T2 may be looked up in the inverted token index with string S2 as result.

In some embodiments related to multi-token searches, instead of a union or intersection operation, different logic combinations may be applied to the token list as was described at 330. For example, if multiple tokens were searched, instead of a simple intersection of a token list, logic combinations may be applied to the tokens such as, for example, (e.g., a OR b AND NOT c). Furthermore, the present embodiments may support complex pattern searches like *c*poly* using single character placeholders. In some embodiments, a pattern search and a similar search may be combined. For example, a pattern search and a similar search may be run consecutively or jointly on a search string.

In some embodiments, the tokenization of search strings may comprise stemming where stemming comprises a heuristic process that removes portions of the search string. For example, stemming a search string may remove an end of a word being tokenized so that a root of the word is tokenized.

Figure 7:
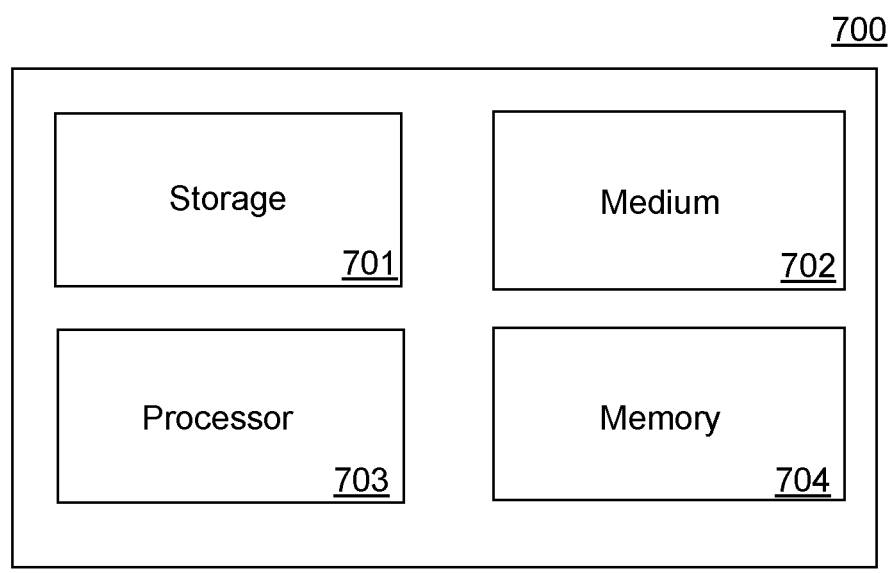
FIG. 7 is a block diagram of a hardware system according to some embodiments.

Now referring to FIG. 7, an embodiment of an apparatus 700 is illustrated. The apparatus 700 may be associated with a search engine. The apparatus 700 may comprise a storage device 701, a medium 702, a processor 703 and a main memory 704. According to some embodiments, the apparatus 700 may further comprise a digital display port, such as a port adapted to be coupled to a digital computer monitor, television, portable display screen, or the like.

The main memory 702 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 702 may comprise a plurality of memory modules.

The processor 703 may include or otherwise be associated with dedicated registers, stacks, queues, etc. that are used to execute program code and/or one or more of these elements may be shared there between. In some embodiments, the processor 703 may comprise an integrated circuit. In some embodiments, the processor 703 may comprise circuitry to perform a method such as, but not limited to, the method described with respect to FIG. 1, FIG. 2 and FIG. 3.

The processor 703 communicates with the storage device 701. The storage device 701 may comprise any appropriate information storage device, including combinations of magnetic storage devices (e.g., a hard disk drive), optical storage devices, and/or semiconductor memory devices. The storage device 701 stores a program for controlling the processor 703. The processor 703 performs instructions of the program, and thereby operates in accordance with any of the embodiments described herein. For example, the processor 703 may tokenize a data string and a search string.

The medium 702 may comprise any computer-readable medium that may store processor-executable instructions to be executed by the processor 703. For example, the medium 702 may comprise a non-transitory tangible medium such as, but is not limited to, a compact disk, a digital video disk, flash memory, optical storage, random access memory, read only memory, or magnetic media.

As used herein, information may be "received" by or "transmitted" to, for example: (i) the apparatus 700 from another device; or (ii) a software application or module within the apparatus 700 from another software application, module, or any other source.

In some embodiments, the storage device 701 stores a database (e.g., including information associated with N-grams and algorithms.). Moreover, various databases might be split or combined in accordance with any of the embodiments described herein.

Embodiments described herein are solely for the purpose of illustration. Those in the art will recognize other embodiments may be practiced with modifications and alterations to that described above.

What is claimed is:

1. A system comprising:
a processor; and
a non-transitory computer-readable medium storing processor-executable process steps executable by the processor to cause the system to:
receive a substring to be searched at a full-text search engine, the full-text search engine comprising a processor;
determine, via the processor, one or more substring N-grams associated with the received sub string;
perform a lookup of each of the one or more substring N-grams in an N-gram index, the N-gram index comprising, for each indexed N-gram, one or more associated token identifiers, each of the token identifiers identifying a token which contains the associated indexed N-gram;
calculate a set of tokens associated with each of the one or more substring N-grams based on the performed lookup;
determine, via the processor, if the substring exists in the calculated set of tokens by determining an order of the one or more substring N-grams within each token of the calculated set of tokens; and
in a case that the order of the one or more substring N-grams within a first token of the calculated set of tokens is determined to be out of order, removing the first token from the calculated set of tokens.

2. A system according to claim 1, wherein the N-grams comprise bigrams.

3. A system according to claim 1, wherein the N-grams comprise trigrams.

4. A system according to claim 1, wherein the set of tokens associated with each of the one or more N-grams comprises an intersection of tokens associated with each of the one or more N-grams.

5. A system according to claim 1, wherein the set of tokens associated with each of the one or more N-grams comprises a union of tokens associated with each of the one or more N-grams.

6. A system according to claim 1, wherein the processor-executable process further cause the processor to:
output results of the determination if the substring exists in the set of tokens.

7. A method implemented by a computing system in response to execution of program code by a processor of the computing system, the method comprising:
receiving a substring to be searched at a full-text search engine, the full-text search engine comprising a processor;
determining, via the processor, one or more substring bigrams associated with the received substring;
performing a lookup of each of the one or more substring bigrams in a bigrams index, the bigrams index comprising, for each indexed bigram, one or more associated token identifiers, each of the token identifiers identifying a token which contains the associated indexed bigram;
calculating a set of tokens associated with each of the one or more substring bigrams based on the performed lookup;
determining, via the processor, if the substring exists in the calculated set of tokens by determining an order of the one or more substring bigrams within each token of the calculated set of tokens;
in a case that the order of the one or more sub string bigrams within a first token of the calculated set of tokens is determined to be out of order, removing the first token from the calculated set of tokens; and
outputting results of the determination if the substring exists in the calculated of tokens.

8. A method according to claim 7, wherein calculating a set of tokens associated with each of the one or more bigrams is based on a union operation.

9. A method according to claim 7, wherein calculating a set of tokens associated with each of the one or more bigrams is based on an intersection operation.

10. A method according to claim 7, wherein the set of tokens associated with each of the one or more N-grams comprises an intersection of tokens associated with each of the one or more bigrams.

11. A method according to claim 7, wherein the set of tokens associated with each of the one or more N-grams comprises a union of tokens associated with each of the one or more bigrams.

12. A system method to claim 7, further comprising:
outputting results of the determination if the substring exists in the set of tokens.

13. A non-transitory computer-readable medium storing program code, the program code executable by a processor of a computing system to cause the computing system to:
receiving a substring to be searched at a full-text search engine, the full-text search engine comprising a processor;
determining, via the processor, one or more substring N-grams associated with the received sub string;
performing a lookup of each of the one or more sub string N-grams in an N-gram index, the N-gram index comprising, for each indexed N-gram, one or more associated token identifiers, each of the token identifiers identifying a token which contains the associated indexed N-gram;
calculating a set of tokens associated with each of the one or more substring N-grams based on the performed lookup, wherein the set of tokens associated with each of the one or more N-grams comprises an intersection of tokens associated with each of the one or more N-grams;
determining, via the processor, if the substring exists in the calculated set of tokens by determining an order of the one or more substring N-grams within each token of the calculated set of tokens;
in a case that the order of the one or more substring N-grams within a first token of the calculated set of tokens is determined to be out of order, removing the first token from the calculated set of tokens; and
outputting results of the determination if the substring exists in the calculated set of tokens.

14. A medium according to claim 13, wherein the N-grams comprise bigrams.

15. A medium according to claim 13, wherein the N-grams comprise trigrams.

16. A medium according to claim 13, wherein the set of tokens associated with each of the one or more N-grams comprises a union of tokens associated with each of the one or more N-grams.

17. A medium according to claim 13, further comprising:
outputting results of the determination if the substring exists in the set of tokens.

18. A medium according to claim 13, wherein the order of the N-grams within the token is based on a language being searched.

* * * * *